METHOD OF AND SYSTEM FOR REMOTE-LOCATION COMPUTER COMMUNICATION VIA TELEPHONE
Filed June 17, 1963
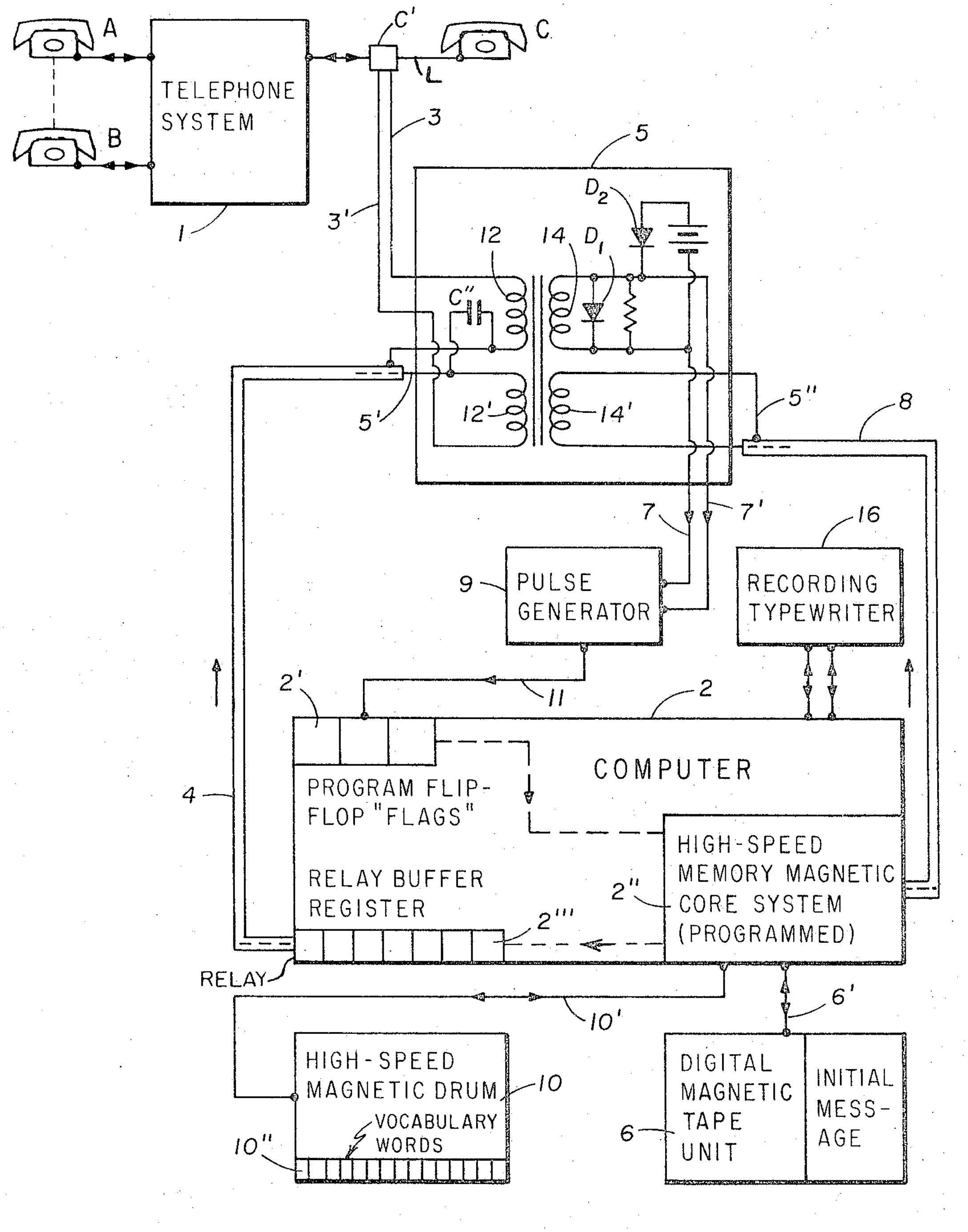
THOMAS M. MARILL
DANIEL J. EDWARDS, INVENTORS
BY Rines and Rines
ATTORNEYS 3,347,988

METHOD OF AND SYSTEM FOR REMOTE-LOCATION COMPUTER COMMUNICATION VIA TELEPHONE

Thomas M. Marill, Cambridge, and Daniel J. Edwards, North Reading, Mass., assignors to Bolt Beranek and Newman Inc., Cambridge, Mass., a corporation of Massachusetts Filed June 17, 1963, Ser. No. 288,398
5 Claims. (Cl. 179—2)

The present invention relates to methods of and systems for remote-location computer communication and, more particularly, though not exclusively, to communicating with a computer with ordinary dial telephone apparatus.

While proposals have heretofore been made for providing a plurality of remote-station-computer communication links, they involve highly complicated, specialized and expensive systems. In accordance with the present invention, however, a new and improved computer-communication-link method and system are provided that make use of existing dial telephone equipment, lines and facilities as well as the inherent properties of telephone ringing and dial switching, thus providing a relatively simple and inexpensive system.

Another object is to provide novel data control apparatus for enabling the use of telephone systems with computers.

A further object is to provide a novel switching-instrument interconnected-line system for computer communication that is of more broad significance.

Other and further objects will be explained hereinafter and will be specifically delineated in the appended claims.

The invention will now be described in connection with the accompanying drawing, the single figure of which is a combined block and schematic circuit digram of a preferred embodiment of the invention.

A conventional telephone system is represented at 1, enabling the dialing of predetermined numbers to produce ringing and permit speech communication between pluralities of pairs of transmitter-receiver instruments A . . . B, etc., over interconnected lines, as has long been well known. For purposes of illustration, the invention will hereinafter be described in connection with permitting a plurality of remote telephone instruments A . . . B of a telephone system, to communicate with a telephone line L connected to a computer 2, such as a general-purpose binary digital computer. This communication enables the introduction into the computer of useful input information and the return of messages or other information, representing computer handling of the input information, to the remote telephone instrument(s). The computer 2, for example, may be of the Type PDP–1 of the Digital Equipment Corporation of Maynard, Mass., described in the text of that company, "Digital Modules," 1962, and in the Programmed Data Processor–1 Manual, 1962, of the said company, in the said company's PDP–1 Technical Bulletin F–17 and PDP–1 Maintenance Manual, 1962; or any other suitable well-known computer apparatus.

In accordance with the invention, use is made, as before stated, of the inherent switching properties of a dial telephone during dialing. Once a remote telephone A . . . B is connected to the computer telephone line L, the party at the remote instrument may dial a sequence of numbers or letters to produce dial-switching data that can be made into suitable computer input impulses for operating the computer programming mechanism and returning replies, mathematical or other computation messages, or stored information to the party at the remote instrument, such as speech messages from stored speech information in the computer 2.

It is believed most conducive to an explanation of one illustrative mode of operation of the invention to start with the ringing of the computer telephone line L by, for example, the remote instrument A, in conventional telephony operation. This ringing constitutes a periodic signal or tone of greater rapidity than the relatively slow impulses produced during dialing, so that the computer 2 can readily distinguish when it is being called from subsequent input data. Associated with computers of the above-mentioned type are a plurality of input flip-flop circuits 2' known as program "flags," described in detail, for example, commencing with page 13 of the said manual and in the said maintenance manual. It suffices for present purposes to state that such an input flip-flop "flag" unit will obviously rapidly and distinctively change state during a ring, the electrical oscillations or signal impulses of which are shown fed from a junction C' on the computer telephone line L via conductors 3 and 3' to a later-described data control unit 5, the output of which is shown at 7, 7', and then to a pulse generator 9 that is, in turn, connected at 11 to the computer "flag" flip-flop input circuits 2'. The programmed portion 2'' of the computer proper thereupon operates the relay of a conventional relay buffer register 2''', also as described in the said manuals and bulletin, in well-known fashion, effectively, through coaxial conductors 4, and by way of one of the inputs 5' of the data control apparatus or unit 5 and the conductors 3, 3', to connect the computer to the remote calling instrument A through the telephone system for reception of dial signals from the calling instrument and the transmission of messages from the computer to that instrument.

At this point, an initial message, perhaps acknowledging the call and offering a service message or instructions, stored in, for example, a digital magnetic tape unit 6 (such as the Type 50 described on page 333 of the said text), connected at 6' with the programmed computer apparatus 2'', may be transmitted along the coaxial line 8 to a further input 5'' of the data control apparatus 5 for transmission through that apparatus, as hereinafter set forth, to the conductors 3, 3', and thence along the line L through the telephone system 1 to the remote station A.

In response to this information or message, the party at station A may dial his coded material by a predetermined sequence of number or letter dialing operations on instrument A; such dialing producing a pair of electrical impulses corresponding to the switching on and off of each dial unit. These impulses are monitored by the data control unit 5, being fed along 3, 3' into the data control unit 5 and therein converted into more distinct pulses, as later discussed. The output of the unit 5 is fed at 7, 7' to a pulse generator 9 that produces sharp pulses, two for each dial unit. A suitable pulse generator, for example, would be the Type 3410 described on p. 161 of the said text; or any other well-known suitable pulse generator.

As these dial pulses produced in the data unit 5 and the pulse generator 9 are fed into the computer 2, a high-speed magnetic drum 10, connected at 10' to the computer, and containing stored vocabulary words 10'', corresponding to the units or letters being dialed and other words to be used in the message to be transmitted from the computer 2, is caused by the programming to transmit through 2'' and the coaxial line 8, words describing the resulting output of the programmed computer operation in response to the input pulses. A sequence of eight input pulses at 2', for example, corresponding to the dialing at A of the number four, may cause the programmed high-speed memory core system 2'' to energize the drum 10 so that the word "four" is then transmitted along 8, through the data control unit 5, conductors 3 and 3', and to the remote instrument A. A suitable drum 10 for this type of operation is described, for example, in published Memorandum M–1102A, July 14, 1961 of the said Digital Equipment Corporation; or other well-known drums, disk files, or cores may also be employed, as is well-known. The nature of the real-time programming operation at 2'' is also clear to those skilled in the art, being generally described, for example, commencing with p. 243 of Programming for Digital Computers, J. Jeenel, McGraw-Hill, 1959; and commencing with p. 137 of Programming and Coding for Automatic Digital Computers, Evans and Perry, McGraw-Hill; and elsewhere.

With the said PDP–1 equipment, for example, a system as shown in the drawing has been successfully operated in the greater Boston, Mass. telephone system with two illustrative types of computer-returned communication available to the telephone user. Upon the dialing of the letter P, a prime-factor service was provided wherein the dialing of any number up to five digits, the prime factors of which are to be computed by the computer, resulted in the word message from the drum 10 of the number dialed, followed by the composite message from the drum 10 of the prime factors thereof computed in the programmed apparatus 2''.

The second service provided in these tests was a game initiated by dialing the letter G and then dialing the remainder resulting after dividing any number up to sixty successively by 3, 4 and 5; the computer then transmitting the message of the computed number. Clearly, other well-known mathematical computations or other information may similarly be transmitted; and after a predetermined time, or number of messages, the relay of the relay buffer registed 2''' may automatically be opened, disconnecting the computer from the remote station A.

It remains, however, to explain the precise nature and operation of the novel data control unit 5. In order to solve the difficult problem of matching the unit not only to the low-impedance telephone line L, but to the relatively high-impedance input of the pulse generator 9 and to the coaxial lines 4 and 8, resort was made to two pairs of cooperating transformer windings 12, 12'–14, 14'. The inner conductor of the coaxial line 4 from the relay 2''' is connected to the upper terminal of the winding 12, and the outer conductor, to the lower terminal of the winding 12. The said terminals are coupled by a capacitor C'' and the other terminals of the windings 12', 12 are connected by respective conductors 3', 3 to the line L. Operation of the relay of the relay buffer register 2''' will thus serve to complete the line circuit through the windings 12–12'. The message line 8 is shown connected to energize the winding 14' and thus transmit the audio or speech messages through 12–12' to conductors 3, 3' and the telephone line L. The ring and dial-switching impulses monitored by the unit 5 are fed from 3, 3' to the windings 12–12' and thence to the winding 14, where they are polarity and level converted and adjusted by the rectifier diodes $D_1$ and $D_2$, thereby controlling characteristics of the ring and dial signals and adapting the same for proper triggering of the pulse generator 9.

Monitoring of the remote-station-computer communication may be audibly effected by the telephone receiver C and permanently recorded by the typewriter or similar recording apparatus 16.

While the method underlying the invention and the apparatus therefor have been described with particular reference to preferred telephone equipment, it will be evident that other types of line-interconnected switching instruments may also be similarly employed. Further modifications will also occur to those skilled in the art and all such are considered to fall within the spirit and scope of the inventon as defined in the appended claims.

What is claimed is:

1. A remote-location computer communication system having, in combination, a telephone system provided with line-interconnected dial and ring telephone instruments; a computer provided with stored messages and a predetermined program responsive to different sets of input pulses; pulse-generating means having means for connecting an input thereof with at least one predetermined telephone line associated with said computer and provided with an output for producing pulses in response to the ring signal initiated from a remote calling telephone instrument and for producing different sets of pulses in response to the dial signals of said calling telephone instrument; and means connected with the said output for applying the produced pulses as an input to the computer; the computer being provided with means responsive to the produced pulses corresponding to the ring signal for connecting it through the said one line to said remote calling telephone instrument for the reception of dial signals and the transmission of messages, means for thereupon transmitting an initial message along the said one line, and means responsive to the produced pulses corresponding to said dial signals for transmitting different messages along said one line corresponding to the dial signals in accordance with the said computer program.

2. The communication system of claim 1, said means for connecting the input of said pulse-generating means to said one telephone line comprising data control means, said means for connecting said computer through said one line to said remote calling telephone including relay means for establishing a connection to said one line through said data control means.

3. The communication system of claim 2, in which said data control means has means for coupling the said messages from the computer to the said one line, means for coupling the said ring and dial signals from the said one line, and means for controlling characteristics of the last-mentioned signals and applying them to the input of said pulse-generating means.

4. The communication system of claim 2, in which said data control means comprises a transformer having two coupled pairs of windings, said relay means being arranged to control the connection of said one line through one of said pairs of windings, one winding of the other pair being connected to the input of said pulse-generating means, and the other winding of said other pair being connected to said computer for receiving said messages therefrom.

5. The communication system of claim 1, in which said means responsive to the pulses produced by said pulse-generating means comprises a flip-flop unit at the input of said computer.

References Cited

UNITED STATES PATENTS

| | | | |
|---|---|---|---|
| 2,974,281 | 3/1961 | Feldman | 179—2 |
| 3,046,340 | 7/1962 | Stoffels | 179—3 |

OTHER REFERENCES

Howard M. Tremaine, "The Audio Cyclopedia," April 1959, p. 216.

IBM Technical Disclosure Bulletin, vol. 1, No. 4, December 1958, p. 5.

JOHN W. CALDWELL, *Acting Primary Examiner.*

DAVID G. REDINBAUGH, *Examiner.*

J. T. STRATMAN, *Assistant Examiner.*